United States Patent
Memon

(10) Patent No.: US 7,732,510 B2
(45) Date of Patent: Jun. 8, 2010

(54) BARRIER BASED FUEL RESISTANT BINDER

(76) Inventor: G. Mohammed Memon, 22756 Zulla Chase Pl., Ashburn, VA (US) 20148

( * ) Notice: Subject to any disclaimer, the term of this patent is extended or adjusted under 35 U.S.C. 154(b) by 245 days.

(21) Appl. No.: 11/775,287

(22) Filed: Jul. 10, 2007

(65) Prior Publication Data

US 2009/0013903 A1   Jan. 15, 2009

(51) Int. Cl.
*C08L 95/00* (2006.01)
(52) U.S. Cl. .......................... 524/59; 106/276
(58) Field of Classification Search .......... 524/59
See application file for complete search history.

(56) References Cited

U.S. PATENT DOCUMENTS

| | | | |
|---|---|---|---|
| 6,444,731 B1 | 9/2002 | Memon | |
| 6,818,687 B2 * | 11/2004 | Memon | 524/68 |
| 2004/0019136 A1 * | 1/2004 | Rajalingam et al. | 524/59 |

OTHER PUBLICATIONS

Ronald C. Van Rooijen, et al, "Performance Evaluation of Jet Fuel Resistant Polymer-Modified Asphalt for Airport Pavements," symposium, Apr. 2004, 13 pages, 2004 FAA Worldwide Airport Technology Transfer Conference, Atlantic City, New Jersey, USA.

Asphalt Institute, "HMA's Versatility Meets Logan's Challenge," web page, posted Nov. 16, 2006, 2 pages, www.asphaltmagazine.com, USA.

The Institute of Materials, Minerals and Mining, "Asphalt Surfaces Designed to Resist Fuel for Use in Runways," journal, Aug. 2004, pp. 15-16, vol. 12 No. 8, Materials World, USA.

* cited by examiner

*Primary Examiner*—Ling-Siu Choi
*Assistant Examiner*—Hui Chin
(74) *Attorney, Agent, or Firm*—Lawrence E. Laubscher, Jr.

(57) ABSTRACT

A fuel resistant binder is characterized by the addition of a carrier curing agent to a modified, unmodified or emulsified asphalt material formed of a mixture of hot, cold or emulsified asphalt and carrier and activator materials. The carrier curing agent preferably is a polyurethane moisture curing solution. A cross-linking material and aggregate are also mixed with the binder to form a material suitable for patching cracks and holes in pavement and the like. The activator assists the polymer material in linking with the asphalt while the carrier prevents the formation of gel or lumps within the asphalt. The carrier curing agent resists the penetration of fuel into the binder.

14 Claims, 2 Drawing Sheets

US 7,732,510 B2

BARRIER BASED FUEL RESISTANT BINDER

BACKGROUND OF THE INVENTION

Gasoline, diesel and jet fuel spills are common occurrences and result in significant damage to the environment and to the pavement on which the spills occur. The United States Environmental Protection Agency is seeking tougher measures in an attempt to decrease the number of spills and provide funds to clean up and repair the damage resulting there from. This includes not only removing contaminated soil but also repairing the damage to pavements.

In order to reduce the damage to pavement from the toxicity of the fuel, fuel-resistant surface coatings have been applied to pavements. The most common coating is a coal tar slurry which is used to seal the pavement. Although coal tar provides an adequate resistance to fuel penetration, it is a known carcinogen and thus many states and the federal government are seeking to restrict or eliminate its use.

The present invention relates to a barrier based fuel resistant binder which can be used to coat pavements and can be mixed with an aggregate to form a material suitable for patching cracks and pot holes in pavements.

BRIEF DESCRIPTION OF THE PRIOR ART

In addition to the coal tar slurry material mentioned above, modified asphalts with a heavy loading of polymer (styrene butadiene styrene) with a performance grade of PG 94-22 has been manufactured by Citgo Asphalt and used as a jet fuel resistance polymer modified asphalt (PMA) as described in Material World, Vol. 12, No. 8, p 15-16, August, 2004. However, jet fuel has been shown to penetrate a pavement formed of such a material.

Another type of polymer modified asphalt is disclosed in the Memon U.S. Pat. No. 6,818,687. In this asphalt, the polymer molecule is linked to the asphalt which results in a product without any gel or lumps. As with the Citgo Asphalt product, the Memon polymer modified asphalt also allowed unacceptable levels of fuel penetration. This indicates that the cross-linked polymer modified asphalt is not retaining the jet fuel spill on the pavement, which reduces the life of the pavement.

The present invention was developed in order to overcome these and other drawbacks of the prior modified asphalts by providing a binder with an improved network structure of increased strength to resist fuel penetration.

SUMMARY OF THE INVENTION

Accordingly, the present invention relates to a method for making a fuel resistant binder in which a modifier material is mixed with hot, cold or emulsified asphalt to form an asphalt mixture and in which a carrier material is mixed with a hot, cold or emulsified activator material to form a carrier slurry. The carrier and activator materials have similar gravity properties to facilitate mixing thereof. The carrier slurry is then mixed with the asphalt mixture to produce a modified asphalt having improved rheological, separation and solubility characteristics. In addition, a carrier curing agent such as a polyurethane moisture curing solution which may contain methylene bisphenyl isocyanate or amines or anhydrides or any other curing agent is mixed with the modified asphalt material to produce a binder material which is fuel resistant. To further strengthen the bonds with a proper network within the material, a cross-linking agent is also mixed with the modified asphalt to increase the resistance to fuel penetration.

An aggregate of crumb rubber, stone, recycled roofing shingles or recycled asphalt pavement matrix is mixed with the binder material to form a patch material for filling holes cracks or pot holes in the pavement.

The modifier material is preferably a polymer or granular crumb rubber. Suitable polymers include styrene butadiene styrene (SBS), styrene butadiene (SB) and styrene butadiene rubber (SBR). The activator is preferably an acid containing a trace amount of sulfur and the carrier is mineral oil.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
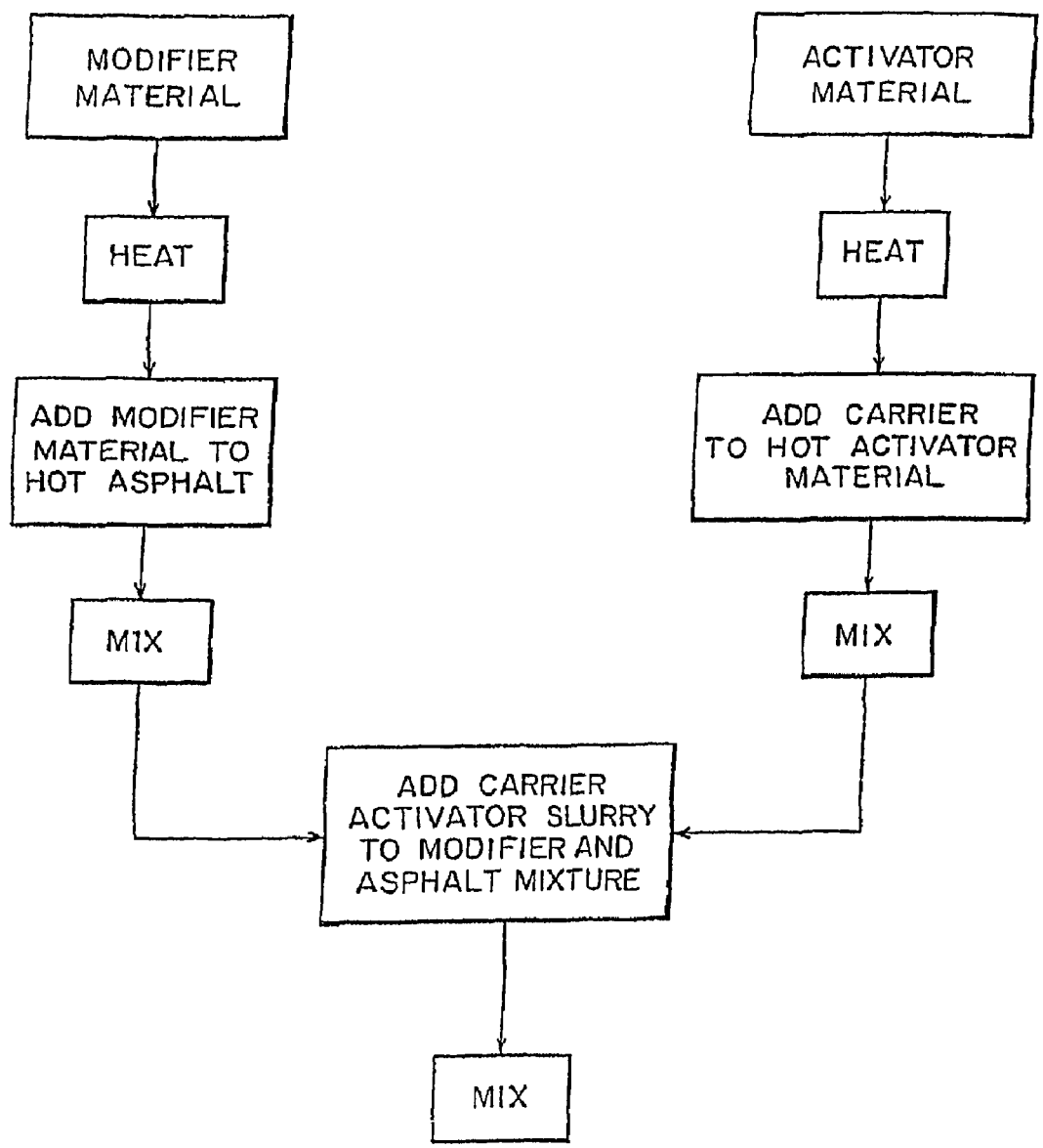
FIG. 1 is a flow diagram showing the method steps for making modified asphalt according to the prior art.

FIG. 1 shows the steps for forming a modified asphalt as described in the Memon U.S. Pat. No. 6,818,687 which is incorporated herein by reference. As shown therein, a modifier material is heated and added to asphalt and then mixed. Preferably, the asphalt is PG 52-34, 58-28, 64-22 or 67-22. The asphalt may be hot, cold, or emulsified. The modifier is a conjugated-diene backbone type polymer such as styrene butadiene styrene (SBS), styrene butadiene (SB) and styrene butadiene rubber (SBR). An example of SBR is granular crumb rubber obtained from discarded automobile tires. The temperature range for the heated modifier material and heated asphalt is 160° C.-220° C. and for the cold or emulsified asphalt material between 20° C.-120° C.

An activator or linking material in a solid form is heated between 65° C. and 260° C. and preferably to around 115° C. Next, a carrier material at room temperature is mixed with the heated or cold activator material to form a carrier slurry. The carrier material for a particular activator material is selected according to Archimedes Principle wherein the materials have similar gravity characteristics. By selecting the appropriate carrier material, a surfactant material is not needed for the activator/carrier slurry. In an alternate embodiment, the modifier material may be mixed with the carrier material and added to the asphalt.

A preferred activator is a powdered acidic material containing a trace amount of sulfur such as is disclosed in the Memon U.S. Pat. No. 6,444,731. If desired, a micro-activator material such as phenyl formaldehyde resin can also be used.

The preferred carrier material is soybean oil or mineral oil such as Parol 350, Parol 320, or Parol 225 or Drakeol 35, 34, or 32 having viscosities at 100° C. and gravities of 60/60 degrees F. The amount of carrier material used to form the carrier slurry is between 35 and 65% by weight of the activator material.

Referring once again to FIG. 1, the carrier slurry is added to the modifier and asphalt mixture and mixed. The activator enhances linking of the polymer to the asphalt molecules while the carrier prevents the formation of gel within the mixture and also helps to disperse the modifier quickly. The modified asphalt does not contain any lumps and has improved rheological and solubility characteristics.

Figure 2:
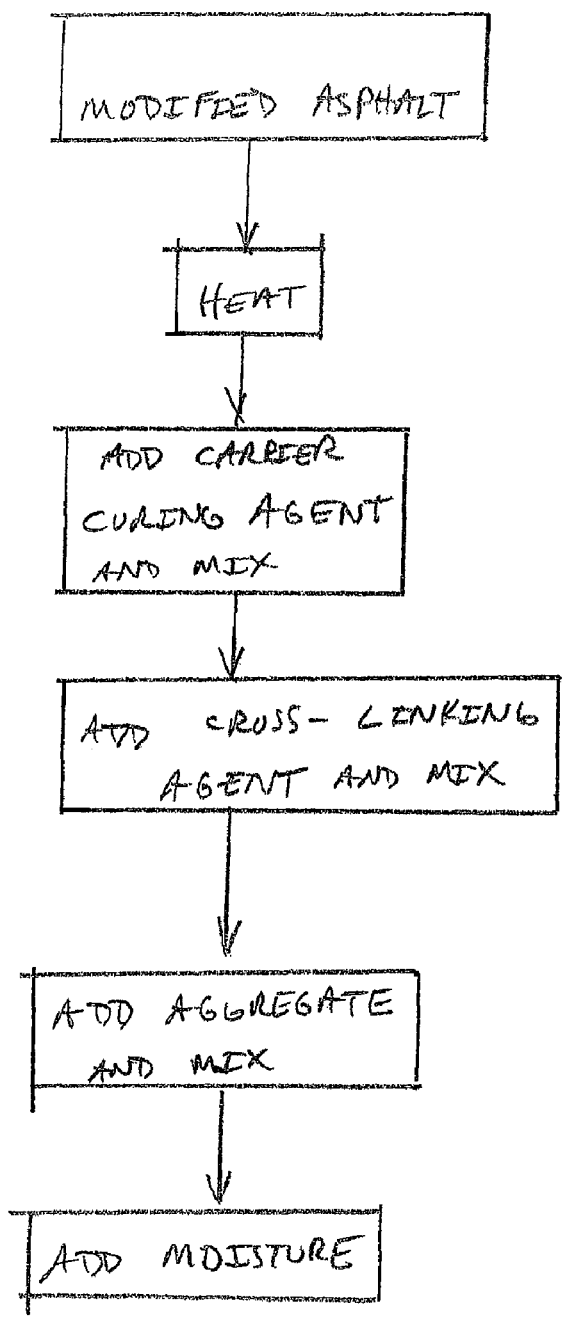
FIG. 2 is a flow diagram showing the method steps for making the fuel resistant binder according to the invention.

Formation of the binder according to the invention will now be described with reference to FIG. 2. The modified asphalt produced by the method according to Memon and described in FIG. 1 is heated to between 25 and 220° C. and a carrier curing agent is added and mixed with the asphalt. The preferred carrier curing agent is a polyurethane moisture curing solution which may contain methylene bisphenyl isocyanate or amines or anhydrides or any other curing agent. In addition, a cross-linking agent such as PT-743 is mixed with the modified asphalt to further strengthen the bond or network between the modifier and the asphalt. The resulting binder has increased resistance to fuel penetration which helps to preserve the pavement which incorporates the binder or which has a binder coating and facilitates clean up of fuel spills.

The binder according to the invention can be mixed with an aggregate or rubber chips to form a pavement for special applications under fuel storage tanks and the like or for more general use pavements such as playgrounds, bus and bicycle lanes, parking lots, cross walks and the like. The binder and aggregate mixture can also used to create a patch material for filling cracks or pot holes in the pavement. Suitable aggregates include granulated crumb rubber, recycled roofing shingles, recycled asphalt pavement, or stone. In addition, a coloring agent can be added to the binder to match the finish of the material to which the binder is being applied or incorporated.

The binder produced in accordance with the invention displays a special elastic behavior with a strong structural network having a greater stiffness at high temperature and less stiffness at low temperature. The strong covalent adhesion between the binder and the aggregate demonstrates improved strength and a high level of stiffness at high temperatures which retards deformation or rutting. At low temperatures, the binder maintains a resistance to thermal cracking. Pavement incorporating the binder can withstand enormous loads which can be exerted by aircraft or heavy vehicles and withstands premature aging and oxidation. The increased strength of the binder is the result of the cross-linking system combining the adhesion properties of concentrated polymer modified or emulsified asphalt and the carbon black network structure of crumb rubber.

While the preferred forms and embodiments of the invention have been illustrated and described, it will be apparent to those of ordinary skill in the art that various changes and modification may be made without deviating from the inventive concepts set forth above.

What is claimed is:

1. A method for making a fuel resistant binder, comprising the steps of
   (a) mixing a modifier material with asphalt to form an asphalt mixture;
   (b) mixing a carrier material with an activator material to form a carrier slurry, said carrier and activator materials having similar gravity properties;
   (c) mixing said carrier slurry with said asphalt mixture to produce a modified asphalt material which has improved rheological, separation and solubility characteristics;
   (d) mixing a cross-linking agent with said modified asphalt; and
   (e) mixing a carrier curing agent with said asphalt material to produce a binder material which is fuel resistant, said carrier curing agent comprising a polyurethane moisture curing solution and at least one of methylene bisphenyl isocyanate and anhydrides.

2. A method as defined in claim 1, and further comprising the step of mixing an aggregate with the binder material to form a pavement material and a material for patching holes and cracks.

3. A method as defined in claim 2, wherein said aggregate comprises at least one of crumb rubber, rubber chips, recycled roofing shingles, recycled asphalt pavement, and stone.

4. A method as defined in claim 1, where said modifier material comprises at least one of polymer and granular crumb rubber.

5. A method as defined in claim 4, wherein said carrier material comprises mineral oil.

6. A method as defined in claim 5, wherein said activator material comprises an acid containing a trace amount of sulfur and said carrier material comprises mineral oil.

7. A method as defined in claim 6, wherein said activator material further comprises a phenyl formaldehyde resin.

8. A method as defined in claim 1, wherein said asphalt is heated or emulsified.

9. A fuel resistant binder, comprising
   (a) asphalt;
   (b) a granular modifier material;
   (c) an activator material for activating the asphalt and modifier material to link the asphalt and modifier material to produce a modified asphalt product with improved rheological, separation and solubility characteristics;
   (d) a carrier material for preventing formation of gel in the modified asphalt product, said activator and carrier materials having similar gravity properties;
   (e) a cross-linking agent; and
   (f) a carrier curing agent which renders said modified asphalt product fuel resistant, said carrier curing agent comprising a polyurethane moisture curing solution and at least one of methylene bisphenyl isocyanate and anhydrides.

10. A fuel resistant binder as defined in claim 9, and further comprising an aggregate, thereby to produce a pavement material and a material for patching holes and cracks.

11. A fuel resistant binder as defined in claim 10, wherein said aggregate comprises at least one of crumb rubber, rubber chips, recycled roofing shingles, recycled asphalt pavement, and stone.

12. A fuel resistant binder as defined in claim 9, wherein said activator material comprises at least one of an acidic material and a phenyl formaldehyde resin.

13. A fuel resistant binder as defined in claim 12, wherein said carrier material comprises mineral oil.

14. A fuel resistant binder as defined in claim 13, wherein said modifier material comprises at least one of polymer and granular crumb rubber.

* * * * *